United States Patent
Hagihara

(10) Patent No.: US 7,415,907 B2
(45) Date of Patent: Aug. 26, 2008

(54) RESIN DOUBLE HELICAL GEAR AND GEAR TRAIN USING SAME

(75) Inventor: Toru Hagihara, Sayama (JP)

(73) Assignee: Enplas Corporation, Kawaguchi-shi, Saitama (JP)

( * ) Notice: Subject to any disclaimer, the term of this patent is extended or adjusted under 35 U.S.C. 154(b) by 720 days.

(21) Appl. No.: 10/910,929

(22) Filed: Aug. 4, 2004

(65) Prior Publication Data
US 2005/0028630 A1      Feb. 10, 2005

(30) Foreign Application Priority Data

| Aug. 4, 2003 | (JP) | ............................... 2003-205602 |
| Sep. 22, 2003 | (JP) | ............................... 2003-329440 |
| Sep. 24, 2003 | (JP) | ............................... 2003-331922 |

(51) Int. Cl.
  *F16H 55/06*      (2006.01)
(52) U.S. Cl. .............................. 74/462; 74/461; 74/457; 74/DIG. 10
(58) Field of Classification Search .................... 74/457, 74/459.5, 461, 462, DIG. 10
See application file for complete search history.

(56) References Cited

U.S. PATENT DOCUMENTS

2005/0274216 A1*  12/2005  Fleytman ..................... 74/457
2007/0017314 A1*  1/2007   Konishi ....................... 74/462

FOREIGN PATENT DOCUMENTS

JP      10-315344      12/1998

* cited by examiner

*Primary Examiner*—David M Fenstermacher
(74) *Attorney, Agent, or Firm*—Bachman & LaPointe, P.C.

(57) ABSTRACT

A gear train for an ink jet printer includes an output gear of a motor, a first idle gear meshing with the output gear, a second idle gear rotatable with the first idle gear, and a driven gear which is mounted on a roller shaft so as to be rotatable therewith and which meshes with the second idle gear. A resin double helical gear is used as each of the output gear and the first idle gear, and a spur gear is used as each of the second idle gear and the driven gear. The resin double helical gear may have a meshing relief portion formed by cutting a chevron-shaped top portion in a central portion in face width directions, which is arranged in a butt portion between a first die and a second die, from a tooth crest to a portion near a bottom lane so as to decrease a tooth thickness.

10 Claims, 16 Drawing Sheets

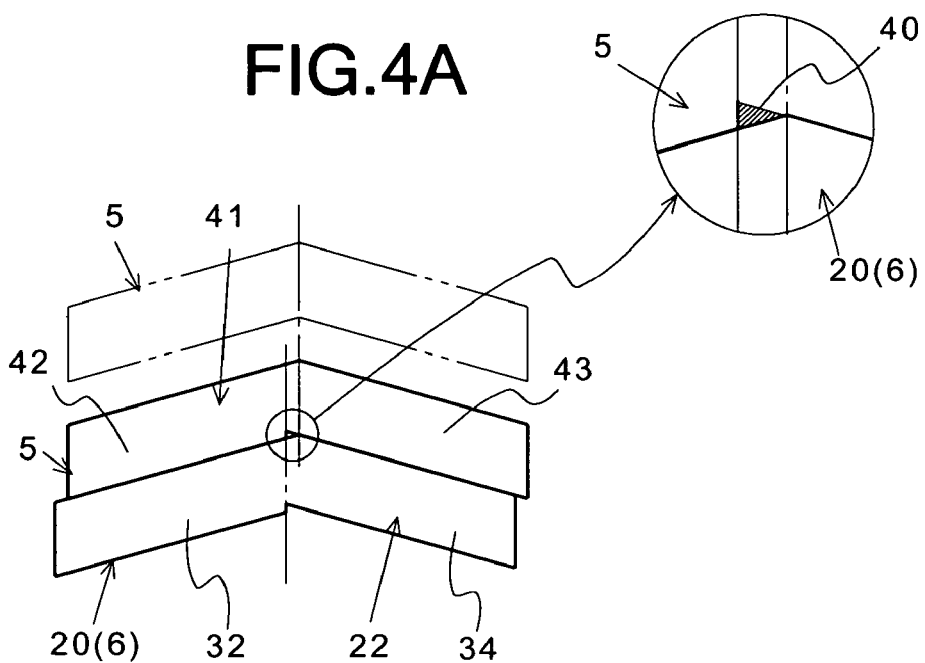
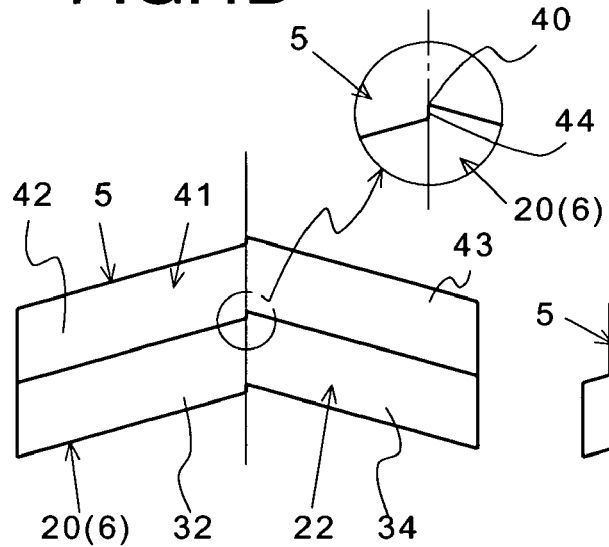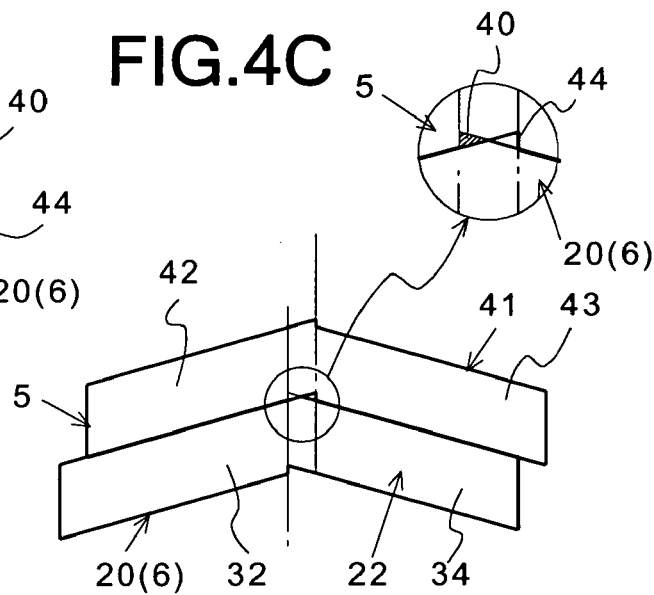

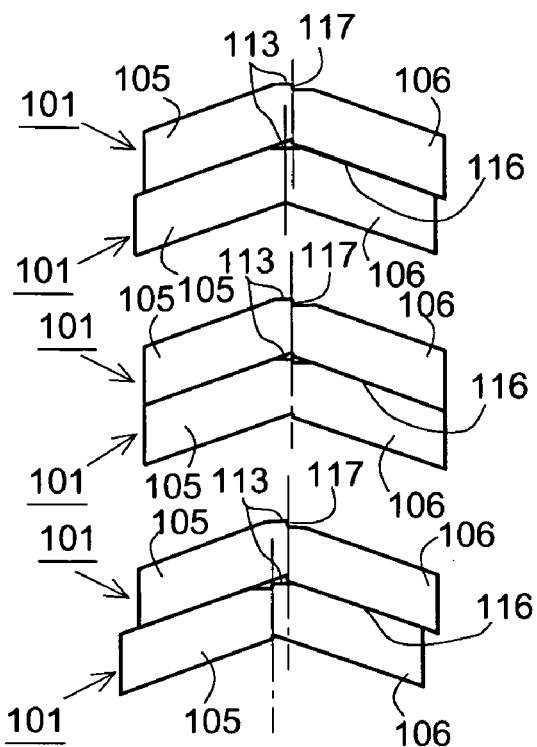
FIG.15A
FIG.15B
FIG.15C
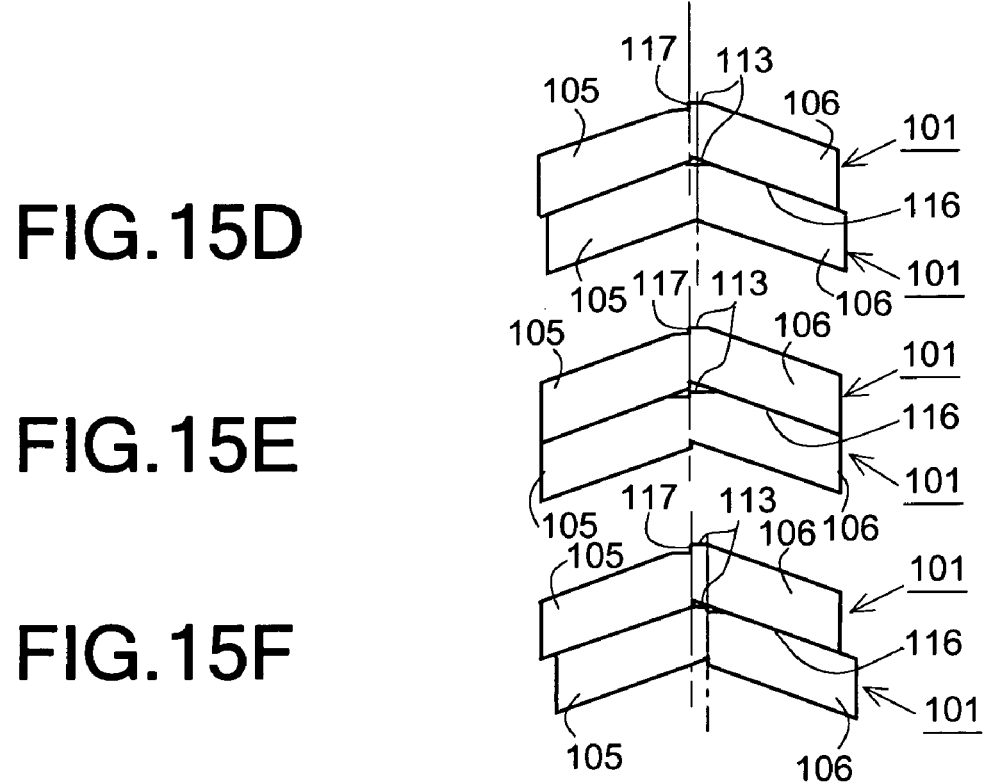
FIG.15D
FIG.15E
FIG.15F

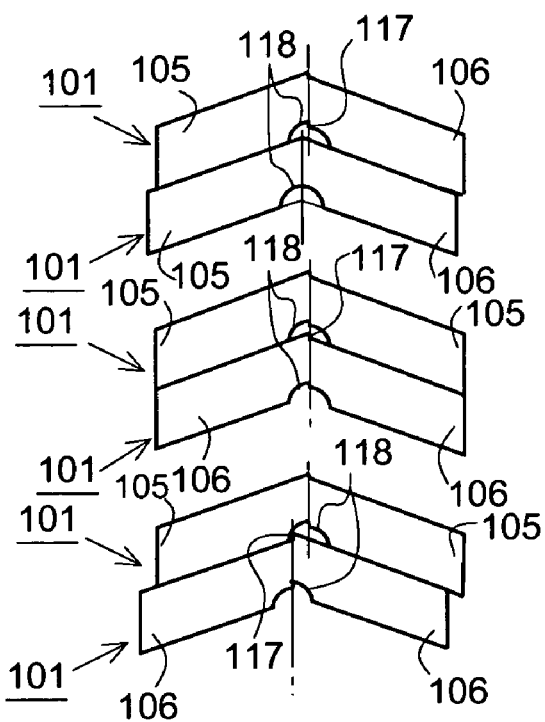
FIG.17A
FIG.17B
FIG.17C
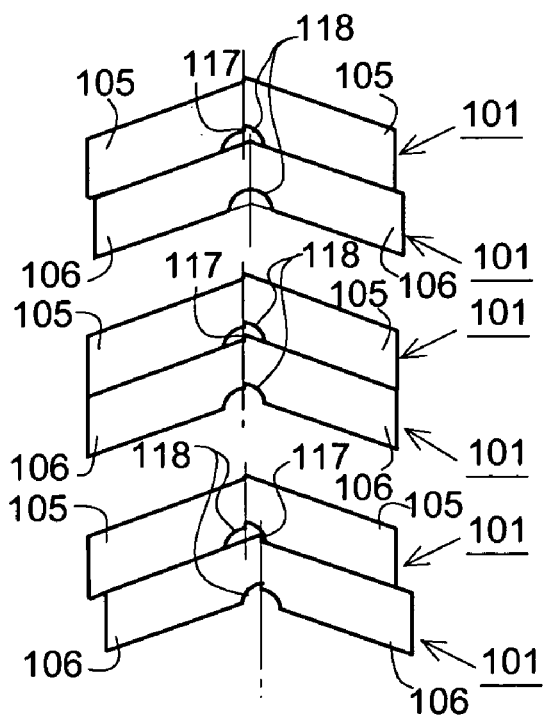
FIG.17D
FIG.17E
FIG.17F

Molten Resin

RESIN DOUBLE HELICAL GEAR AND GEAR TRAIN USING SAME

BACKGROUND OF THE INVENTION

1. Field of the Invention

The present invention generally relates to a double helical gear (or a herringbone gear) formed from a resin, and a gear train using the same. More specifically, the invention relates to a resin double helical gear widely used for various image forming systems, such as copying machines, facsimile terminal equipment and printers, various automotive parts, such as wiper driving units, power window driving units and auto slide door driving units, various electronic equipment, and precision instruments, which are required to silently transmit power at a high rotational speed and at a high load and which are required to be lightened and inexpensively produced.

2. Description of the Prior Art

A typical ink jet printer is often connected to a personal computer to be used, and is arranged on or near a desk, on which the personal computer is operated. It is desirable to suppress the operation noises and vibrations of the ink jet printer.

Therefore, in conventional ink jet printers, a helical gear is used as each of an output gear of a motor and an idle gear meshing with the output gear, and the contact ratio of the output gear with the idle gear is increased to decrease noises. In addition, a spur gear is used as each of a driven gear of a roller shaft and an idle gear meshing therewith to prevent a thrust force from being applied to the roller shaft. Furthermore, if a thrust force is applied to the roller shaft, a transporting roller moves so as to be dislocated in the axial direction of the roller shaft. Then, a sheet (a sheet-like recording material, such as a copy paper or a post card), transported by the transporting roller, is transported so as to be dislocated in the axial directions of the roller shaft. Thus, the position at which printing starts is deviated so that the precision of printing is deteriorated.

However, if the helical gears are used as the output gear and the idle gear meshing therewith, like in conventional ink jet printers, the thrust force is applied to both of the gears. Thus there are some cases where vibrations are caused by the backlash of both of the gears and the mounting portion of the rotational shaft rotatably supporting thereon the gears.

Resin helical gears can smoothly mesh with another gear at a high rotational speed, and can silently transmit power. In addition, resin helical gears allow a load to be easily dispersed along the tooth trace, and can transmit power at a high load. Therefore, conventionally, resin helical gears have been widely used for the power transmission devices of business machines, such as copying machines, printers and facsimile terminal equipments, as well as power transmission devices of automotive parts, precision instruments and various electronic equipment.

However, in resin helical gears, there is a disadvantage in that an axial thrust load directly proportional to torque is caused since the teeth are helical. In order to eliminate such a disadvantage of resin helical gears, the thrust load caused during the transmission of power must be received by a thrust bearing. However, there are some cases where the thrust bearing can not be arranged due to constraints on space and the configuration of power transmission devices.

There has been developed a technique for forming a resin double helical gear, which can silently transmit power at a high speed and at a high load similar to a resin helical gear and which can prevent a thrust load from being caused during the transmission of power, by injection molding (see Japanese Patent Laid-Open No. 10-315344).

As shown in FIG. 23, a resin double helical gear 130 disclosed in Japanese Patent Laid-Open No. 10-315344 is formed in large quantities in a short time by the steps of: causing a first die 133, which is designed to form a portion (a first gear portion 132) on one side in face width directions from a central portion 131 in the face width directions, to butt a second die 135, which is designed to form a portion (a second gear portion 134) on the other side in the face width directions from the central portion 131; injecting a molten resin into a cavity 136 defined by the first die 133 and the second die 135; separating the first die 133 and the second die 135 from each other after the resin in the cavity 136 is cooled and solidified; and removing the solidified resin from the cavity 136 defined by the first die 133 and second die 135.

When the separated dies (the first die 133 and the second die 135) are caused to butt each other to allow injection of the molten resin into the cavity 136 to mold the resin double helical gear 130, even if a butt surface 137 between both of the dies 133 and 135 is slightly dislocated, the butt surface 137 between the first gear portion 132 and second gear portion 134 of the injection molded resin double helical gear 130 is also dislocated as shown in FIGS. 12A and 12B. As a result, there is a problem in that a stepped portion (dislocation) 117 is produced at the top portion 104 of a chevron-shaped tooth 138 and on the reverse 116 thereof. If such a stepped portion 117 is produced at the top portion 104 of the chevron-shaped tooth 138 and on the reverse 116 thereof, only a half tooth portion (the first gear portion 132 or the second gear portion 134) in face width directions transmits power, so that thrust is produced similar to helical gears.

In such a case, it is considered that a slit 140 extending along the butt surface 137 between the first gear portion 132 and the second gear portion 134, as shown in FIG. 24 is formed to prevent a discrepant meshing due to the interference with the stepped portion 117 at the top portion 104 of each tooth of a companion resin double helical gear 130 meshing therewith or on the reverse 116 thereof. However, there are problems in that the structure of the die is complicated and the effective facewidth relating to the flexural strength of the tooth is decreased.

SUMMARY OF THE INVENTION

It is therefore an object of the present invention to eliminate the aforementioned problems and to provide a resin double helical gear capable of reducing operation noises and vibrations of an ink jet printer or the like arranged in the vicinity of an operator, and a gear train using the same.

It is another object of the present invention to provide a resin double helical gear capable of effectively preventing a discrepant meshing without damaging the strength of teeth even if the butt surface between two separated dies is dislocated.

In order to accomplish the aforementioned and other objects, according to one aspect of the present invention, a resin double helical gear comprises: a first gear portion arranged on one side in face width directions from a substantially central portion in the face width directions, the first gear portion having teeth which are helical in a direction; and a second gear portion arranged on the other side in the face width directions from the substantially central portion in the face width directions, the second gear portion having teeth which are helical in a direction opposite to that of the first gear portion, wherein the first gear portion and the second gear portion are molded so as to be integrated with each other in such a shape that a pair of helical gear halves being helical in opposite directions to each other are stuck together.

In this resin double helical gear, a stepped portion of each of teeth between the first and second gear portions may be elastically or plastically deformed to collapse to allow an excess thickness due to deformation of the stepped portion to be received in a space between the resin double helical gear and a companion gear when the resin double helical gear meshes with the companion gear. Each of teeth of the resin double helical gear may have a different helix angle from that of a companion gear meshing therewith. Each of the first and second gear portions may be curved so as to be convex toward a companion gear meshing with the resin double helical gear. The resin double helical gear may further comprise a meshing relief portion having such a shape that a chevron-shaped top portion of each of teeth of the resin double helical gear in the substantially central portion in the face width directions is cut off. The resin double helical gear may further comprise a meshing relief portion having such a shape that a reverse to a chevron-shaped top portion of each of teeth of the resin double helical gear in the substantially central portion in the face width directions is recessed.

According to another aspect of the present invention, a gear train comprises a first resin double helical gear and a second double helical gear meshing therewith, the first resin double helical gear comprising: a first gear portion arranged on one side in face width directions from a substantially central portion in the face width directions, the first gear portion having teeth which are helical in a direction; and a second gear portion arranged on the other side in the face width directions from the substantially central portion in the face width directions, the second gear portion having teeth which are helical in a direction opposite to that of the first gear portion, wherein the first gear portion and the second gear portion are molded so as to be integrated with each other in such a shape that a pair of helical gear halves being helical in opposite directions to each other are stuck together.

In this gear train, a stepped portion of each tooth of the first resin double helical gear between the first and second gear portions may be elastically or plastically deformed to collapse to allow an excess thickness due to deformation of the stepped portion to be received in a space between the first resin double helical gear and the second double helical gear when the first resin double helical gear meshes with the second double helical gear. Each tooth of the first resin double helical gear may have a different helix angle from that of the second double helical gear. Each of the first and second gear portions of the first resin double helical gear may be curved so as to be convex toward the second double helical gear. The first resin double helical gear may further comprise a meshing relief portion having such a shape that a chevron-shaped top portion of each of teeth of the first resin double helical gear in the substantially central portion in the face width directions is cut off. The first resin double helical gear may further comprise a meshing relief portion having such a shape that a reverse to a chevron-shaped top portion of each tooth of the first resin double helical gear in the substantially central portion in the face width directions is recessed.

According to another aspect of the present invention, a gear train comprises: an output gear of a motor, the output gear being a resin double helical gear; a first idle gear meshing with the output gear, the first idle gear being a resin double helical gear; a second idle gear rotatable with the first idle gear, the second idle gear being a spur gear; and a driven gear which is mounted on a roller shaft so as to be rotatable therewith and which meshes with the second idle gear, the driven gear being a spur gear.

According to a further aspect of the present invention, there is provided a resin double helical gear molded by injecting a resin into a cavity defined by causing a first die to butt a second die, the resin double helical gear comprising: a first gear portion arranged on one side in face width directions from a central portion in the face width directions, the first gear portion being molded by the first die so as to have teeth which are helical in a direction; a second gear portion arranged on the other side in the face width directions from the central portion in the face width directions, the second gear portion being molded by the second die so as to have teeth which are helical in a direction opposite to that of the first gear portion and each of which is connected to a corresponding one of the teeth of the first gear portion to form a chevron-shaped top portion in a butt portion between the first and second gear portions; and a meshing relief portion formed by cutting the chevron-shaped top portion off, from a tooth crest to a portion near a bottom land so as to decrease a tooth thickness.

According to a still further aspect of the present invention, there is provided a resin double helical gear molded by injecting a resin into a cavity defined by causing a first die to butt a second die, the resin double helical gear comprising: a first gear portion arranged on one side in face width directions from a central portion in the face width directions, the first gear portion being molded by the first die so as to have teeth which are helical in a direction; a second gear portion arranged on the other side in the face width directions from the central portion in the face width directions, the second gear portion being molded by the second die so as to have teeth which are helical in a direction opposite to that of the first gear portion and each of which is connected to a corresponding one of the teeth of the first gear portion to form a chevron-shaped top portion in a butt portion between the first and second gear portions; and a meshing relief portion formed by recessing a reverse to the chevron-shaped top portion from a tooth crest to a portion near a bottom land so as to prevent the reverse from contacting a chevron-shaped top portion of a companion gear meshing with the resin double helical gear.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIGS. 4A through 4C are plan views of teeth showing a meshing state that an output gear meshes with a first idle gear in the first preferred embodiment;

FIGS. 12A and 12B are views showing a state that the first and second gear portions of a resin double helical gear are dislocated from each other, wherein FIG. 12A shows a first embodiment thereof and FIG. 12B shows a second embodiment thereof;

FIGS. 14A and 14B are views showing the occurrence of discrepancy during the meshing of a conventional resin double helical gear, wherein FIG. 14A shows a first embodiment thereof, and FIG. 14B shows a second embodiment thereof;

FIGS. 15A through 15F are views showing the meshing state of teeth of the resin double helical gear in the second preferred embodiment;

FIGS. 17A through 17F are views showing the meshing state of teeth of the first modified example of the resin double helical gear in the second preferred embodiment;

DESCRIPTION OF THE PREFERRED EMBODIMENTS

Referring now to the accompanying drawings, the preferred embodiments of the present invention will be described below in detail.

First Preferred Embodiment

Figure 1:
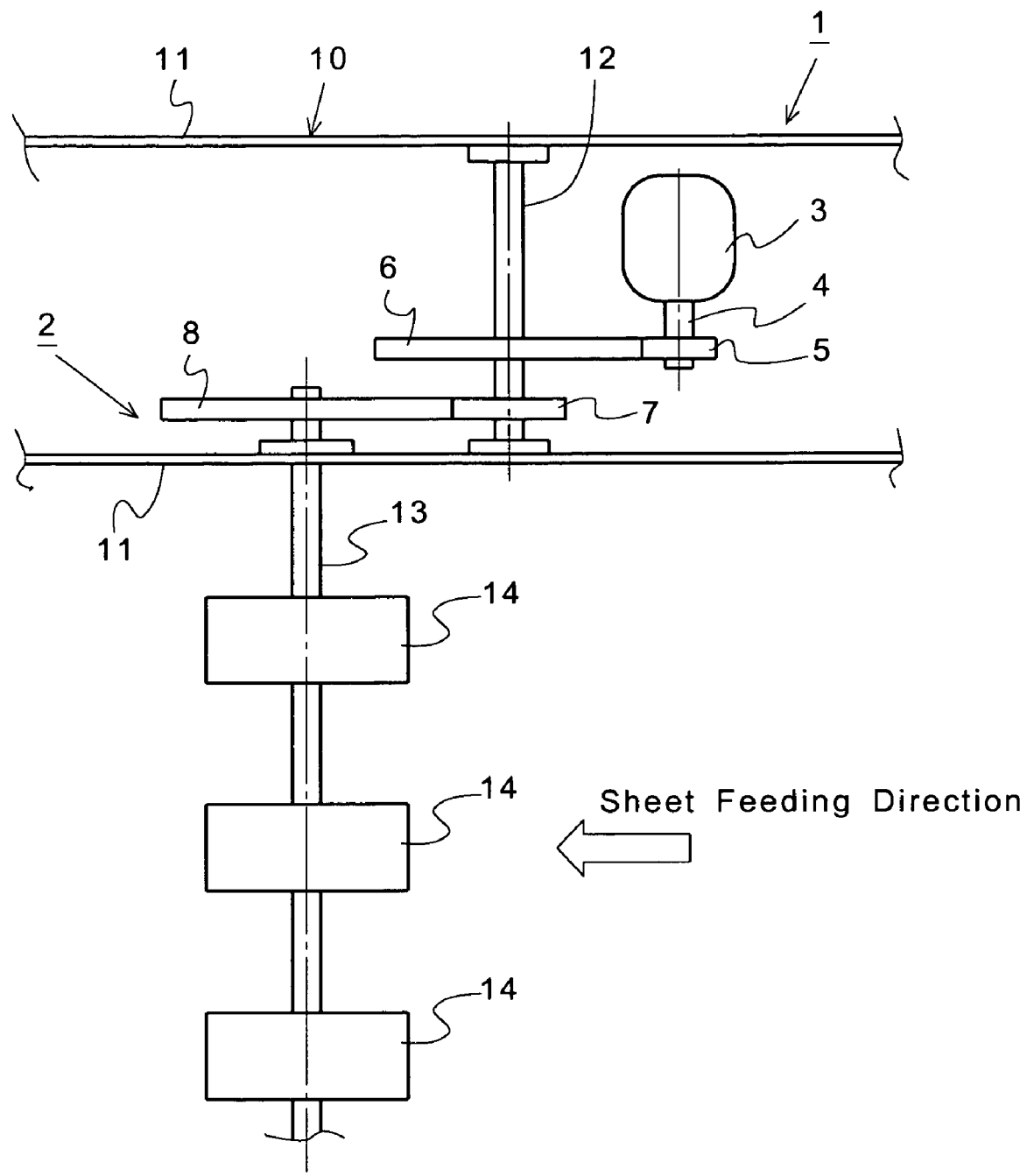
FIG. 1 is a schematic diagram showing the first preferred embodiment of a gear train of an ink jet printer according to the present invention.

FIG. 1 is a schematic diagram showing a gear train 2 of an ink jet printer 1 in the first preferred embodiment according to the present invention. As shown in this figure, the gear train 2 of the ink jet printer 1 in this preferred embodiment comprises an output gear 5 fixed to an output shaft 4 of a motor 3, a first idle gear 6 meshing with the output gear 5, a second idle gear 7 rotatable with the first idle gear 6, and a driven gear 8 meshing with the second idle gear 7. At least the output gear 5 and first idle gear 6 are resin gears formed by precisely carrying out the injection molding of a plastic resin, such as polyacetal, polyamide, polycarbonate or ABS resin.

The first idle gear 6 and the second idle gear 7 are fixed to a shaft 12 rotatably supported on a frame 11 of a printer body 10, and are designed to rotate with the shaft 12. Furthermore, the first idle gear 6 and the second idle gear 7 may be integrated with each other so as to be rotatable with respect to the shaft 12 fixed to the frame 11.

The driven gear 8 meshing with the second idle gear 7 is fixed to a roller shaft 13. If the driven gear 8 is rotated by the second idle gear 7, the driven gear 8 rotates with the roller shaft 13 to allow a transporting roller 14 to feed a sheet.

In such a gear train 2 in this preferred embodiment, a double helical gear is used as each of the output gear 5 and the first idle gear 6 mesh therewith, and a spur gear is used as each of the second idle gear 7 and the driven gear 8 mesh therewith.

In such a gear train 2 of the ink jet printer 1, no thrust force is applied to the output gear 5 and the first idle gear 6 when the rotation of the motor 3 is transmitted from the output gear 5 to the first idle gear 6. Therefore, according to this preferred embodiment, it is possible to reduce backlash noises (operation noises) and vibrations due to a thrust force. In addition, since the spur gear is used as each of the second idle gear 7 and the driven gear 8, the transport roller 14 can continuously rotate at a predetermined position without applying any thrust force to the roller shaft 13, so that it is possible to precisely transport a sheet. As a result, the ink jet printer 1 using the gear train 2 in this preferred embodiment can improve the precision of image formation (e.g., the precision of printing).

In the ink jet printer 1 using the gear train 2 in this preferred embodiment, a sheet fed from a paper feeding cassette by a paper feeding roller is fed into an image forming section by means of the transporting roller 14 driven by the gear train 2. In the image forming section, ink is sprayed onto the sheet to form an image (print characters) and thereafter, the sheet is delivered to a paper discharging tray.

Figure 2:
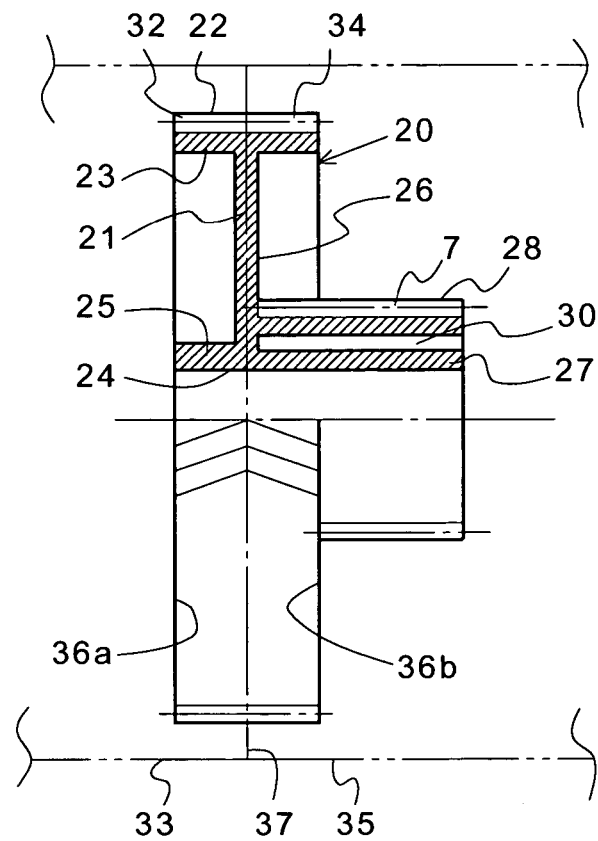
FIG. 2 is a view showing a resin double helical gear in the first preferred embodiment, which shows a cross section of an upper half of the gear.

FIG. 2 shows a resin double helical gear 20 serving as the first idle gear 6 constituting a part of the gear train 2 in this preferred embodiment. In the resin double helical gear 20 shown in FIG. 2, a spur gear serving as the second idle gear 7 is formed on a side of a web 21 so as to be integrated therewith. Thus, the resin double helical gear 20 integrally formed with the spur gear 7 is molded by injecting a resin (polyacetal, polycarbonate or the like). In the resin double helical gear 20, an outside rim 23 having a large number of teeth 22 is connected to an inside boss 25 having an axial hole 24 by means of the substantially disk-shaped web 21. On the outer periphery of the boss 27 extending toward one side 26 of the web 21 of the resin double helical gear 20, a large number of teeth 28 are formed. The boss 27 having the large number teeth 28 on the outer periphery thereof constitutes the spur gear serving as the second idle gear 7. Furthermore, in the boss 27 constituting the spur gear 7, a cylindrical lightening hole 30 concentric with the axial hole 24 is formed so as to substantially have the same depth as the face width of the spur gear 7. If the lightening hole 30 is thus formed, the thickness of the spur gear 7 and other portions can be uniform, so that the cooling rate of the spur gear 7 and other portions can be uniform after injection molding. Thus, the rate of shrinkage of the spur gear 7 and other portions can be uniform, so that it is possible to improve the precision of the teeth 28 of the spur gear 7.

Figure 3:
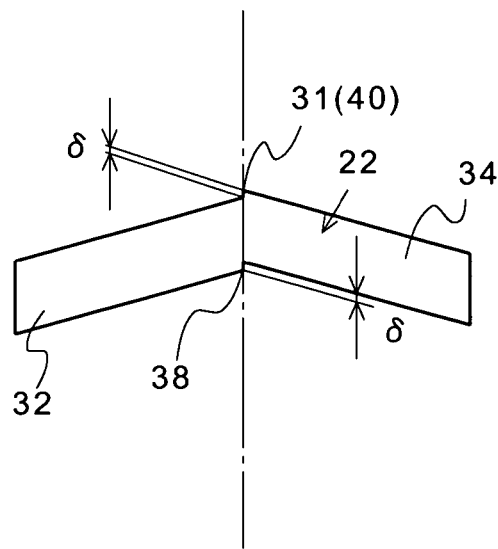
FIG. 3 is a plan view of a tooth of the resin double helical gear of FIG. 2.

As shown in FIGS. 2 and 3, the teeth 22 of the resin double helical gear 20 has such a planar shape that helical gear halves, which are helical in opposite directions, are stuck together. The resin double helical gear 20 is molded by injecting a resin into a cavity 36a of a first die 33, which is designed to form a first gear portion 32 on one side in face width directions from a chevron-shaped top portion 31 in a substantially central portion in face width directions, and into a cavity 36b of a second die 35, which is designed to form a second gear portion 34 and the spur gear 7 on the other side in the face width directions from the chevron-shaped top portion 31 in the substantially central portion in the face width directions, after causing the first die 33 to butt the second die 35.

In the resin double helical gear 20 thus formed by injection molding, if the butt surface 37 between the first die 33 and second die 35 is dislocated, the connecting portion of the teeth 22 of the first gear portion 32 and second gear portion 34 is also dislocated to produce a stepped portion δ at the top portion 31 of the chevron-shaped teeth 22 and on the reverse thereof. However, in this preferred embodiment, the stepped portion δ of the teeth 22 can be very small by devising the structure of the injection molding die (the first die 33 and the second die 35) and so forth, so that it is possible to transmit power without damaging characteristics as a double helical gear (without producing thrust).

That is, as shown in FIGS. 4A and 4C, the protruding portion (slant line portion) 40 having the very small stepped portion δ locally contacts the teeth 41 of the companion resin double helical gear (the output gear 5) meshing therewith during the transmission of power, so that the load to be transmitted concentrates on a small contact area portion. Therefore, the protruding portion 40 is elastically or plastically deformed to collapse, so that the excess thickness due to the deformation of the protruding portion 40 is received in a space on the tooth crest side, a space on the bottom land side or a space between the gear and the tooth flank of the companion gear. As a result, it is possible to transmit rotation while the teeth 41, 22 of the first gear portions 42, 32 and second gear portions 43, 34 of both of the gears 5, 20 meshing with each other contact each other (while two surfaces contact each other), respectively, so that it is possible to prevent thrust from being produced during the transmission of power.

Furthermore, FIG. 4A is a plan view showing a meshing state where the teeth 41 of the resin double helical gear (the output gear 5) having no stepped portion mesh with the teeth 22 of the resin double helical gear 20 (the first idle gear 6) having the stepped portion. In the state shown in FIG. 4A, the protruding portion 40 of the very small stepped portion is collapsed by transmission load, so that the excess thickness due to the deformation of the protruding portion 40 is received in a space on the tooth crest or bottom land side.

FIG. 4B is a plan view of the teeth 41 and 22 showing a meshing state in a case where the teeth 41 and 22 of both of the resin double helical gears (the output gear 5 and the first idle gear 6) meshing with each other have the same shape (the stepped portion δ shown in FIG. 3 has the same shape). In the state shown in FIG. 4B, since the protruding portion 40 of the stepped portion of one of the gears 5, 20 meshing with each other is fitted into the recessed portion 44 of the stepped portion of the other gear, the protruding portion 40 of the stepped portion δ (see FIG. 3) does not collapse, so that the teeth 41, 22 of the first gear portions 42, 32 and second gear portions 43, 34 of both of the gears 5, 20 contact each other, respectively.

FIG. 4C is a plan view of the teeth 41 and 22 showing a meshing state in a case where the shape of the dislocation (stepped portion) of the companion resin double helical gear (the output gear 5) meshing with the resin double helical gear 20 is reverse to the shape of the dislocation (stepped portion) of the resin double helical gear 20 (the first idle gear 6). In the state shown in FIG. 4C, the protruding portion 40 of the very small stepped portion on the side of the first idle gear 6 is collapsed by the transmission load, so that the excess thickness due to the deformation of the protruding portion 40 is received in a space on the tooth crest side, a space on the bottom land side or the recessed portion 44 of the stepped portion on the side of the output gear 5.

According to the resin double helical gear 20 with such a construction, it is possible to silently transmit a large torque without producing thrust.

Since the resin double helical gear 20 in this preferred embodiment is integrally formed with the spur gear serving as the second idle gear 7, it is possible to reduce the number of gears, and it is possible to reduce the number of steps of assembling the gear train 2, so that it is possible to reduce the price of the gear train 2.

If a metal double helical gear is substituted for the resin double helical gear 20 in this preferred embodiment, it is possible to reduce the weight of the gear train 2.

Since the resin double helical gear 20 in this preferred embodiment does not produce thrust, the thickness of the web can be thinner than that of the resin double helical gear, so that it is possible to omit the radial rib.

Figure 7:
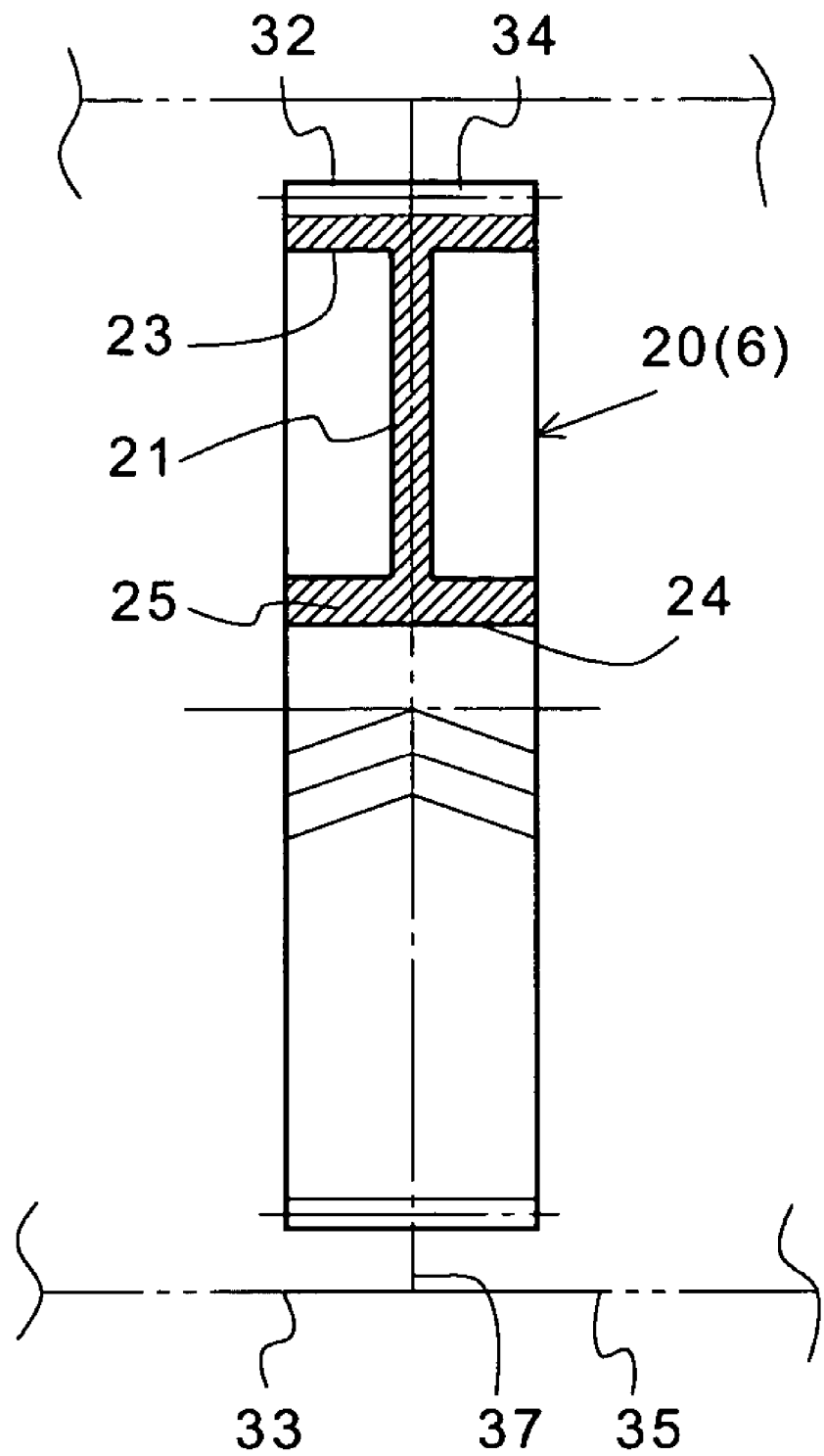
FIG. 7 is a view showing a modified example of a resin double helical gear in the first preferred embodiment, which shows a cross section of an upper half thereof.

Furthermore, as shown in FIG. 7, the resin double helical gear 20 in this preferred embodiment may be only formed with the first idle gear 6 without being formed as a combined gear with the spur gear (the second idle gear 7). The resin double helical gear 20 thus formed can be used as each of the output gear 5 and the first idle gear 6 meshing therewith.

As shown in FIG. 2, the resin double helical gear 20 in this preferred embodiment has a large diameter portion as the first idle gear 6, and a small diameter portion as the second idle gear 7. However, the present invention should not be limited thereto, but the outside diameter and so forth may be suitably changed in accordance with the rotational transmission ratio of the gear train 2 and so forth.

Figure 5A:
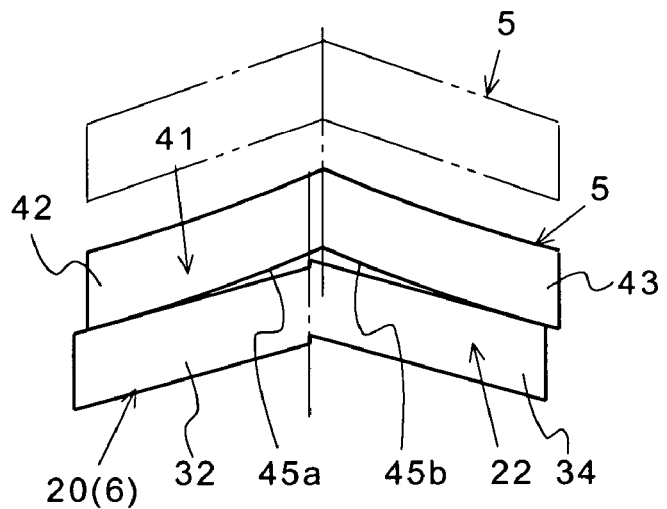
FIGS. 5A through 5C are plan views of teeth showing a first modified example of a meshing state that an output gear meshes with a first idle gear in the first preferred embodiment.
Figure 5B:
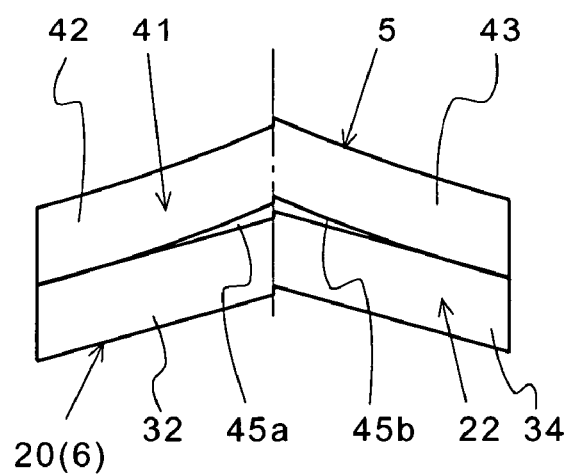
Figure 5C:
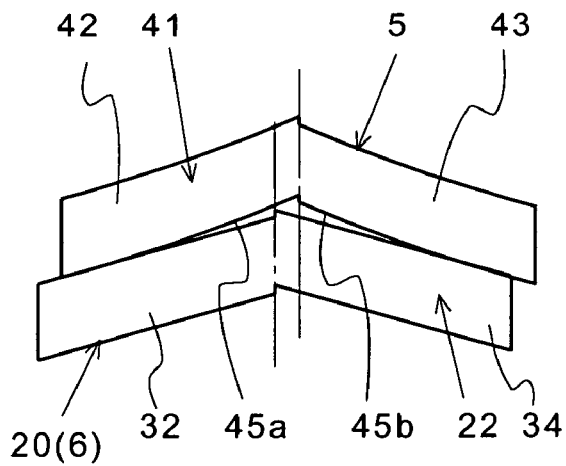

FIGS. 5A through 5C show a first modified example of the above described preferred embodiment. In this example, the helix angle of the teeth 41 of the companion resin double helical gear (the output gear 5) meshing with the resin double helical gear 20 (the first idle gear 6) is larger than the helix angle of the teeth 22 of the resin double helical gear 20 (the first idle gear 6). That is, the helix angle of the companion resin double helical gear (the output gear 5) is determined so as to prevent the tooth flanks 45a and 45b of the output gear 5 from contacting the stepped portion of the first idle gear 6 and so as to cause the end portions of the first and second gear portions 42 and 43 of the output gear 5 on both sides of the tooth flanks 45a and 45b in face width directions to contact the first and second gear portions 32 and 34 of the first idle gear 6.

Furthermore, FIG. 5A is a plan view of the teeth 41 and 22 showing a meshing state in a case where the companion resin double helical gear (the output gear 5) has no stepped portion although the resin double helical gear 20 (the first idle gear 6) has the stepped portion δ (see FIG. 3). FIG. 5B is a plan view of the teeth 41 and 22 showing a meshing state in a case where both of the gears 5 and 20 meshing with each other have stepped portions having the same shape. FIG. 5C is a plan view of the teeth 41 and 22 showing a meshing state in a case where the shape of the dislocation (stepped portion) of the companion resin double helical gear (the output gear 5) is reverse to the shape of the dislocation (stepped portion) of the resin double helical gear 20 (the first idle gear 6). In all of such states, according to this example, the first gear portions 42, 32 and second gear portions 43, 34 of both of the gears 5 and 20 contact each other, respectively, so that it is possible to transmit power without producing thrust.

Figure 6A:
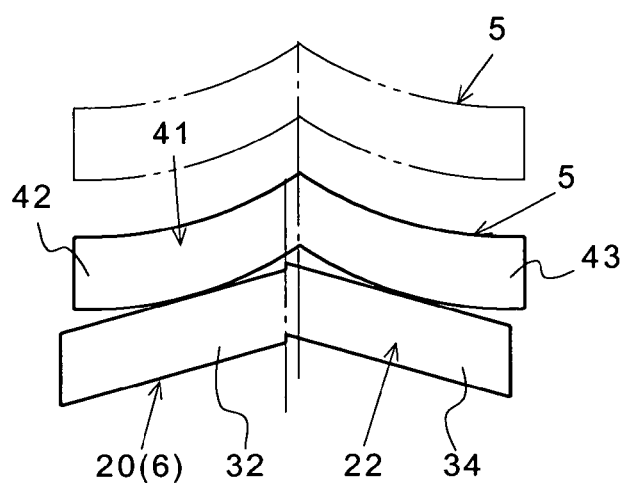
FIGS. 6A through 6C are plan views of teeth showing a second modified example of a meshing state that an output gear meshes with a first idle gear in the first preferred embodiment.
Figure 6B:
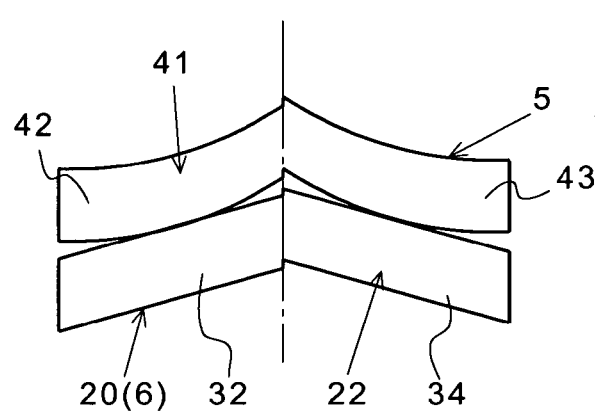
Figure 6C:
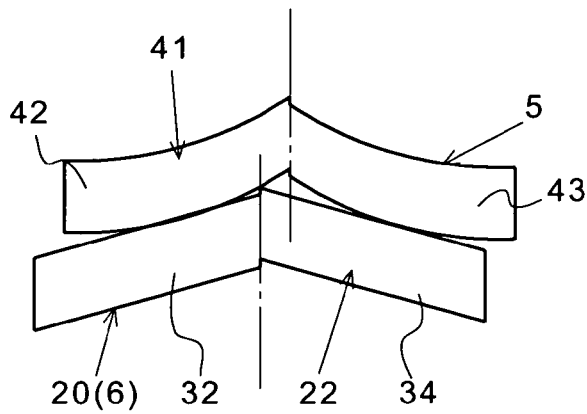

FIGS. 6A through 6C show a second modified example of the above described preferred embodiment. In this example, the first and second gear portions 42 and 43 of the output gear 5 are curved so as to be convex toward the first idle gear 6. If the teeth 41 of the companion resin double helical gear (the output gear 5) are thus formed, the central portion of the teeth 41 of each of the first and second gear portions 42 and 43 of the output gear 5 can contact the teeth 22 of the first idle gear 6, so that it is possible to transmit power without producing thrust.

As described above, in the first preferred embodiment of the present invention, the double helical gear is used as each of the output gear of the motor and the first idle gear meshing therewith, so that no thrust force is produced during the transmission of power. Thus, it is possible to reduce noises and vibrations caused by a thrust force.

Moreover, in the first preferred embodiment of the present invention, since the spur gear is used as each of the second idle gear, which is designed to transmit power to the roller shaft, and the driven gear, no thrust force is applied during the transmission of power between the second idle gear and the drive gear, and the transporting roller does not move so as to be dislocated along the roller shaft.

Second Preferred Embodiment

Figure 8:
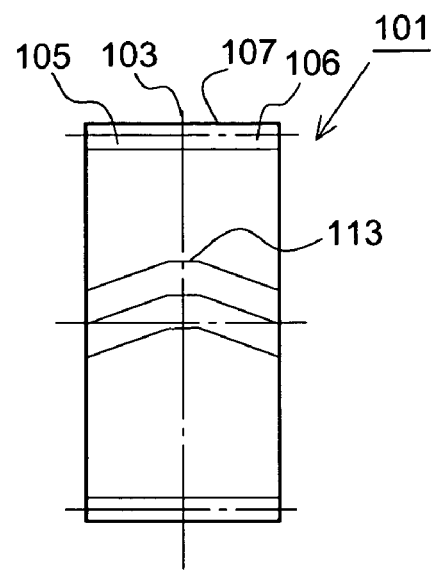
FIG. 8 is a front view of the second preferred embodiment of a resin double helical gear according to the present invention.
Figure 9:
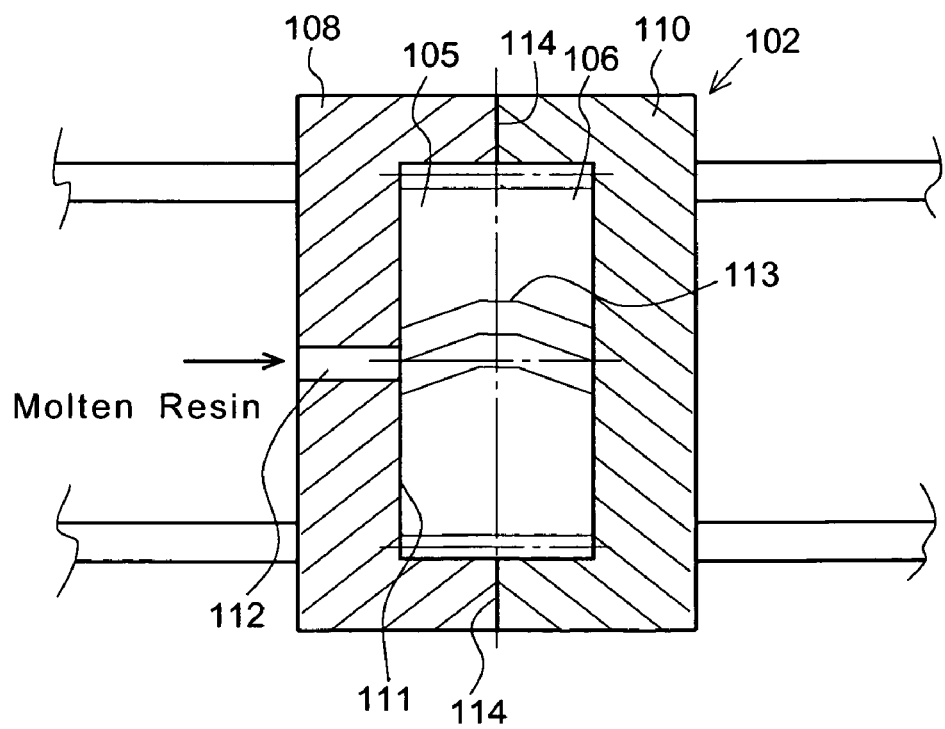
FIG. 9 is a sectional view schematically showing an injection molding die for forming the resin double helical gear of FIG. 8.

FIG. 8 shows the second preferred embodiment of a resin double helical gear 101 according to the present invention, and FIG. 9 is a schematic sectional view of an injection molding die 102 for forming the resin double helical gear 101.

Figure 11:
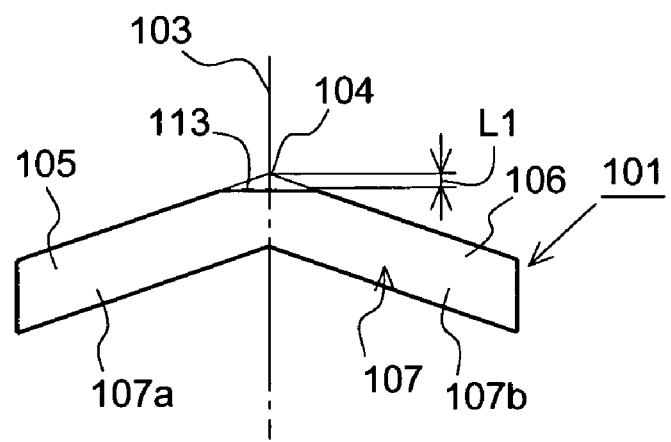
FIG. 11 is a plan view of a tooth of the resin double helical gear in the second preferred embodiment.

As shown in FIG. 8, the resin double helical gear 101 in this preferred embodiment has such a shape that two helical gear halves having opposite helix directions to each other are stuck together, and comprises a first gear portion 105 on one side in face width directions from a chevron-shaped top portion 104 (see FIG. 11) in a central portion 103 in the face width directions, and a second gear portion 106 on the other side in the face width directions from the chevron-shaped top portion 104 in the central portion 103 in the face width directions. In FIGS. 8 and 11, the teeth 107 of the first gear portion 105 of the resin double helical gear 101 extend in a lower left direction, and the teeth 107 of the second gear portion 106 of the resin double helical gear 101 extend in a lower right direction. The teeth 107a of the first gear portion 105 are integrated with the teeth 107b of the second gear portion 106 to constitute the chevron-shaped (substantially inverted V-shaped) teeth 107.

Figure 10:
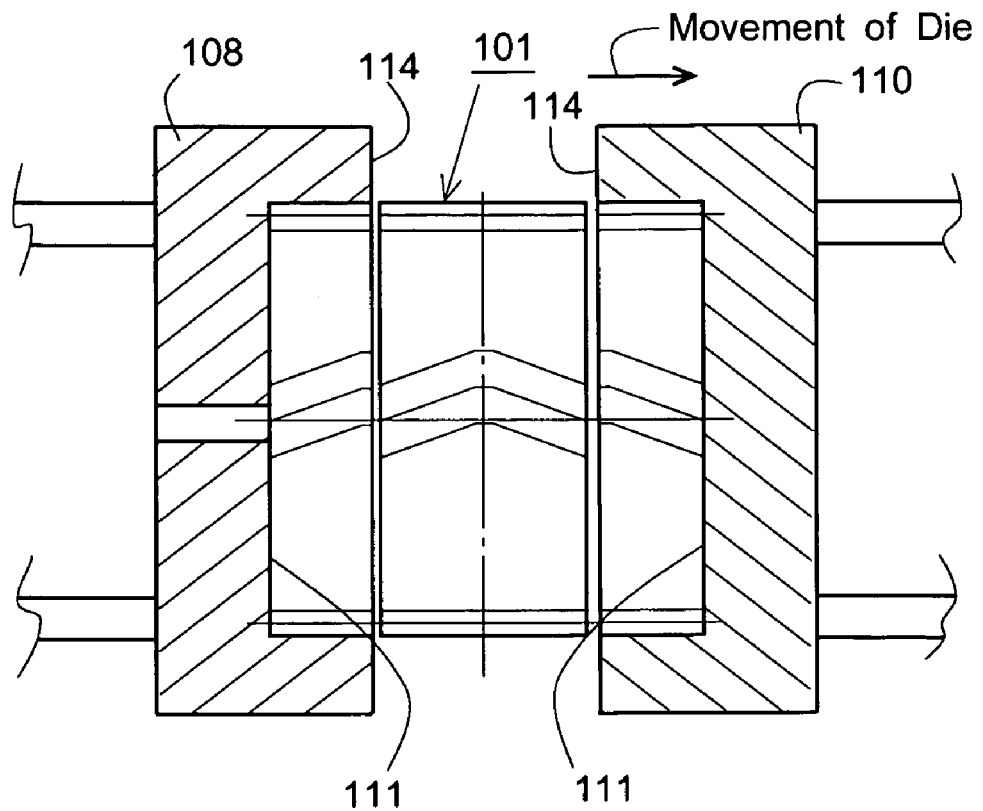
FIG. 10 is a sectional view of the injection molding die of FIG. 9 during mold releasing.

As shown in FIG. 9, such a resin double helical gear 101 is molded by injecting a molten resin (e.g., a molten resin of polyacetal, polyamide, polyphenylene sulfide or polybutylene terephthalate) from a gate 112 into a cavity 111 which is formed by causing a first die 108, which is designed to form the first gear portion 105, to butt a second die 110 which is designed to form the second gear portion 106. As shown in FIG. 10, after at least one of the first die 108 and the second die 110 for injection molding is moved so as to be separated from the other die (after the second die 110 is moved so as to be separated from the first die 108 in this preferred embodiment), the cooled and solidified resin double helical gear 101 in the cavity 111 defined by the first die 108 and second die 110 is released.

FIG. 11 is an enlarged plan view schematically showing the teeth 107 of the resin double helical gear 101 thus molded by injection molding. As shown in FIG. 11, the resin double helical gear 101 in this preferred embodiment has a meshing relief portion 113 which is formed by cutting the chevron-shaped top portion 104 off so as to decrease the tooth thickness from the tooth crest to a portion near the bottom land (to a position at which the distance from the bottom land is smaller than the bottom clearance). The meshing relief portion 113 is formed by transferring the inside shape of the cavity 111 defined by the first die 108 and the second die 110 when the above described injection molding is carried out. The meshing relief portion 113 is arranged on the side of the butt portion 114 between the first die 108 and the second die 110 (see FIG. 9).

Figure 12A:
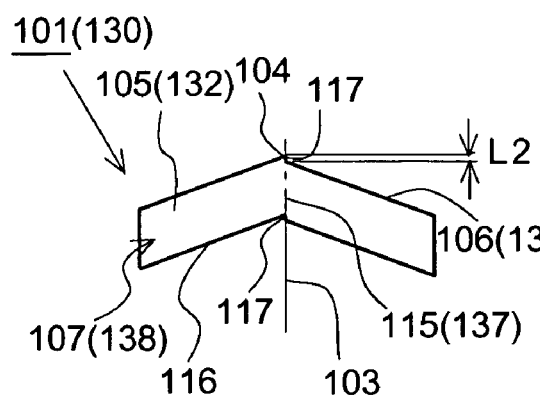
Figure 12B:
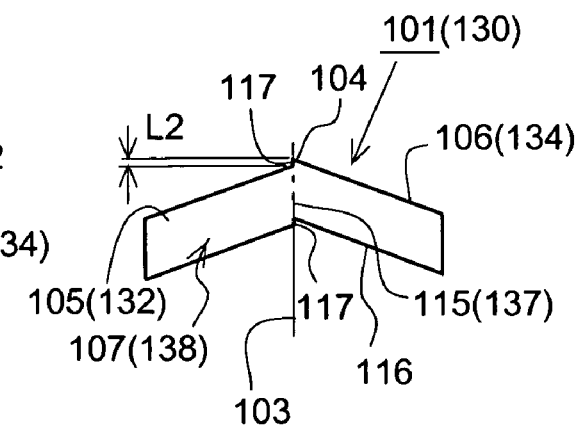
Figure 13:
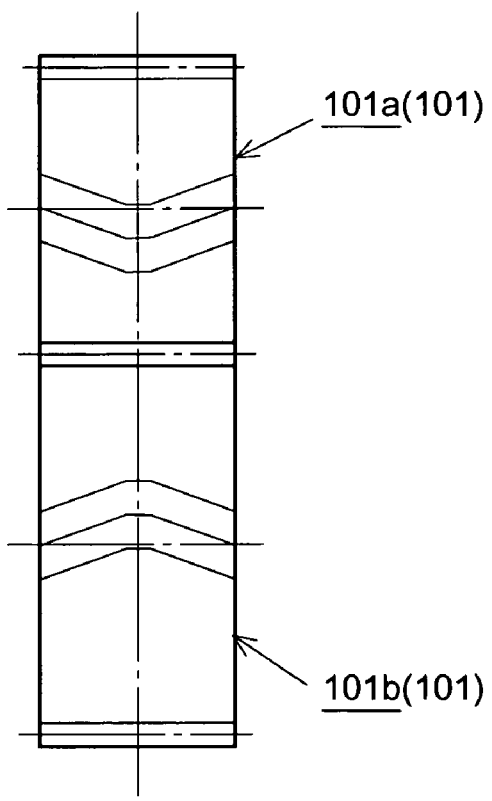
FIG. 13 is a view showing a state that the resin double helical gear in the second preferred embodiment is used.
Figure 14A:
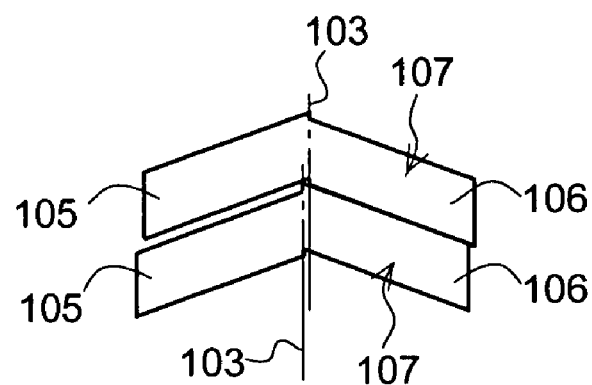
Figure 14B:
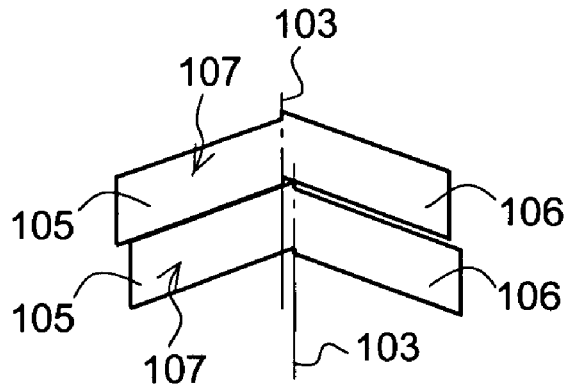

When the resin double helical gear 101 is thus formed by injection molding, if the butt portion 114 between the first die 108 and the second die 110 is dislocated, the butt surface 115 between the first gear portion 105 and the second gear portion 106 is also dislocated (by L2) to form stepped portions 117 in the chevron-shaped top portion and on the reverse thereof as shown in FIGS. 12A and 12B. In such a case, if the meshing relief portion 113 shown in FIG. 11 is not formed, when a pair of resin double helical gears 101 (101a, 101b) mesh with each other as shown in FIG. 13, only one of the first gear portion 105 and the second gear portion 106 meshes with the teeth 107 of the companion gear (the resin double helical gear 101), as shown in FIGS. 14A and 14B, so that power is transmitted by only half of the teeth 107 in face width directions. As a result, even if the resin double helical gear 101 is used, thrust is produced similar to a helical gear. Furthermore, FIG. 14A shows an example where power is transmitted by only the second gear portion 106 of the teeth 107, and FIG. 14B shows an example where power is transmitted by only the first gear portion 105 of the teeth 107.

However, the resin double helical gear 101 in this preferred embodiment has the meshing relief portion 113 in the top portion 104 of the chevron-shaped teeth 107 as shown in FIG. 11. Therefore, as shown in FIGS. 15A through 15F, the meshing relief portion 113 does not interfere with the stepped portion 117 on the reverse 116 of the teeth 107 of the companion gear, and the first gear portions 105, 105 and second gear portions 106, 106 of the pair of resin double helical gears 101 meshing with each other contact each other, respectively, so that it is possible to transmit power in the whole area in the face width directions.

FIGS. 15A through 15C show a state where the first gear portion 105 of the upper resin double helical gear 101 is dislocated upwards with respect to the second gear portion 106, and FIGS. 15D through 15F show a state where the second gear portion 106 of the upper resin double helical gear 101 is dislocated upwards with respect to the first gear portion 105. FIGS. 15A and 15D show a state where the first gear portion 105 and the second gear portion 106 of the lower resin double helical gear 101 are not dislocated. FIGS. 15B and 15E show a state where the first gear portion 105 and the second gear portion 106 of the lower resin double helical gear 101 are dislocated similar to those of the upper resin double helical gear 101. FIGS. 15C and 15F show a state where the first gear portion 105 and the second gear portion 106 of the lower resin double helical gear 101 are dislocated in the opposite direction to the dislocation of the first gear portion 105 and the second gear portion 106 of the upper resin double helical gear 101. As shown in FIGS. 15A through 15F, since the meshing relief portion 113 is formed in the butt portion between the first gear portion 105 and the second gear portion 106, even if the butt surface between the first gear portion 105 and the second gear portion 106 is dislocated, the first gear portions 105, 105 and second gear portions 106, 106 of the pair of resin double helical gears 101 mesh with each other, respectively.

Furthermore, the amount of dislocation of the butt portion 114 between the first die 108 and the second die 110 is actually measured in every injection molding machine to be used, or predicted by simulation or the like. The cut-out amount L1 of the meshing relief portion 113 is determined so as to be equal to or greater than the measured or predicted value.

According to the resin double helical gear 101 in this preferred embodiment with such a construction, even if the butt surface 115 between the first gear portion 105 and the second gear portion 106 is dislocated, the meshing relief portion 113 can absorb the dislocation of the butt surface 115. Therefore, it is possible to transmit power in the substantially whole area in the face width directions of the chevron-shaped teeth 107, and it is possible to silently transmit power at a high load and at a high rotational speed.

In addition, according to the resin double helical gear 101 in this preferred embodiment, since it is possible to transmit power in the substantially whole area in the face width directions of the chevron-shaped teeth 107, it is possible to prevent a thrust load, which is produced in the case of a helical gear, from being produced, so that it is not required to receive the thrust load by a thrust bearing. As a result, according to this preferred embodiment, since it is not required to provide the thrust bearing, a pair of resin double helical gears can be arranged in a narrow space, and it is possible to reduce the weight and price of the gears.

Figure 16:
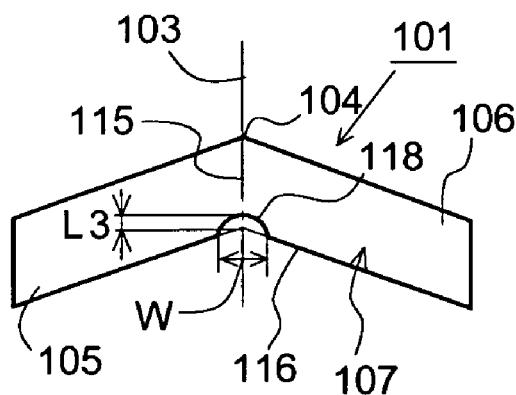
FIG. 16 is a plan view of a first modified example of a tooth of a resin double helical gear in the second preferred embodiment.

FIG. 16 is an enlarged plan view of a first modified example of teeth 107 of a resin double helical gear 101 in this preferred embodiment, and corresponds to FIG. 11. That is, the teeth 107 of the resin double helical gear 101 in this example has a meshing relief portion 118 which is formed by recessing the reverse 116 to the top portion 104 in a substantially circular-arc shape.

The meshing relief portion 118 is formed by recessing the tooth flank of the reverse 116 to the top portion 104 along the central portion 103 in face width directions from the tooth crest to a portion near the bottom land, and by transferring the inside shape of the cavity 111, which is defined by the first die 108 and the second die 110, during injection molding (see FIG. 9). As shown in FIGS. 17A through 17F, the recessed amount L3 and width W of the meshing relief portion 118 are determined so that the meshing relief portion 118 can absorb the dislocation (the stepped portion 117) of the butt surface 115 between the first gear portion 108 and the second gear portion 106 due to the dislocation of the butt portion 114 between the first die 108 and second die 110 and so that the first gear portions 105, 105 and second gear portions 106, 106 of the pair of resin double helical gears 101, 101 meshing with each other can contact each other, respectively, to transmit rotation.

Furthermore, the dislocated states between the first gear portion 105 and second gear portion 106 in FIGS. 17A through 17F correspond to those in FIGS. 15A through 15F.

Also according to this example, with such a construction, it is possible to obtain the same advantageous effects as those in the above described preferred embodiment.

Figure 18:
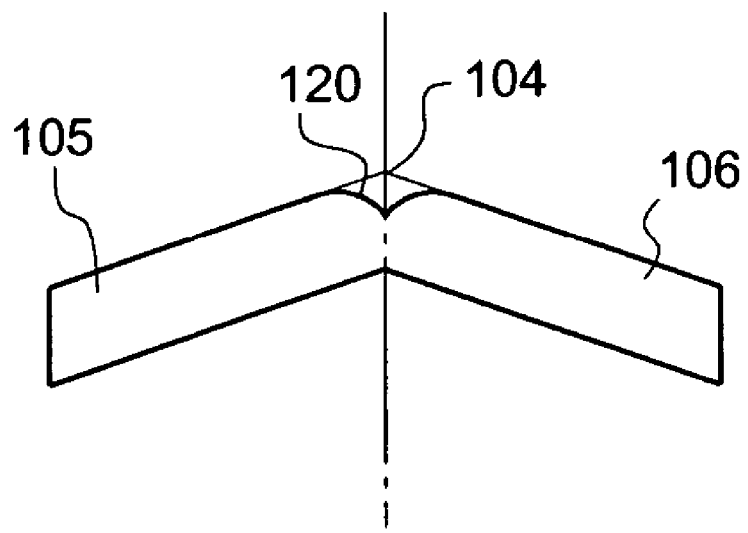
FIG. 18 is a plan view of a second modified example of a tooth in the second preferred embodiment.

Furthermore, the shape of the meshing relief portions 113 and 118 should not be limited to that in the above described preferred embodiment and examples, if the first gear portions 105, 105 and the second gear portions 106, 106 of a pair of resin double helical gears 101, 101 meshing with each other can contact each other, respectively, to transmit power even if the butt portion 114 between the first die 108 and the second die 110 is dislocated. For example, as shown in FIG. 18, a meshing relief portion 120 may be formed by cutting portions of the first and second gear portions 105 and 106 near the top portion 104 out in a substantially circular-arc shape.

In order to cause the portion of the first gear portion 105 or the second gear portion 106 near the top portion thereof to have a circular-arc shape, the tooth profile may be designed so that the portion of the first gear portion 105 or the second gear portion 106 near the top portion thereof has a crowning. In this case, the crowning may be provided on only one end of the top portion 104 of the first gear portion 105 or the second gear portion 106, or on both ends of the gear portion 105 or 106. Alternatively, a tooth profile where the portion of the first gear portion 105 or the second gear portion 106 near the top portion thereof is thicker than other portions may be adopted to utilize a sink mark when the resin is molded in the portion of the first gear portion 105 or the second gear portion 106 near the top portion thereof.

Figure 19:
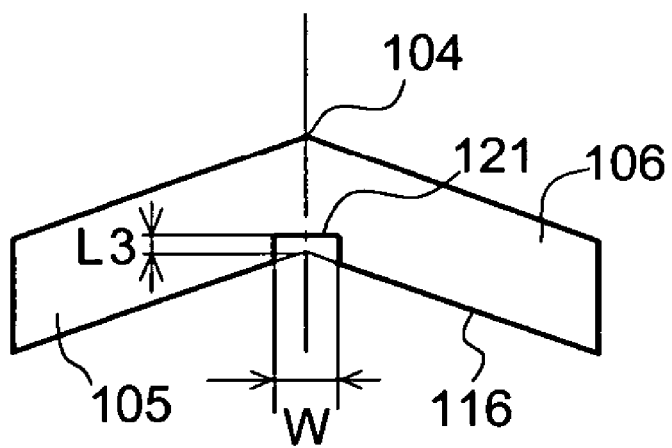
FIG. 19 is a plan view of a third modified example of a tooth in the second preferred embodiment.

As shown in FIG. 19, a meshing relief portion 121 may be formed by recessing the reverse 116 to the top portion 104 in a rectangular shape along the central portion 103 in face width directions from the tooth crest to a portion near the bottom land. Alternatively, a meshing relief portion may be formed by recessing the reverse 116 in a shape other than circular-arc and rectangular shapes.

Figure 20:
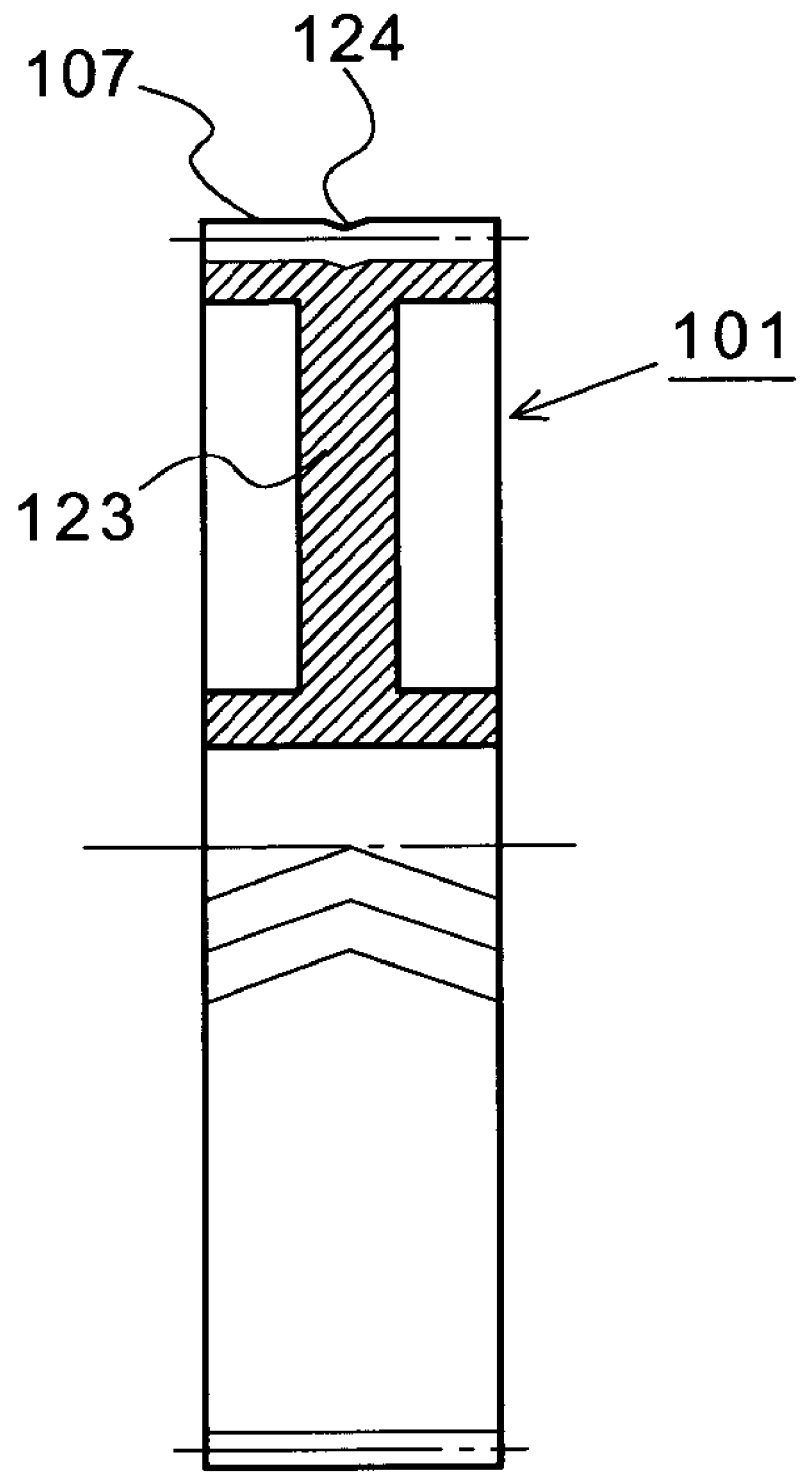
FIG. 20 is a front view of a fourth modified example of a resin double helical gear in the second preferred embodiment, which shows a cross section of an upper half thereof.

If the resin double helical gear 101 has a shape shown in FIG. 20, a web 123 may be designed so as to be relatively thick to intentionally produce a sink mark 124 in the central portion in face width directions of the teeth 107 of the resin double helical gear 101 during molding, and to use the sink mark 124 as a meshing relief portion.

Figure 21:
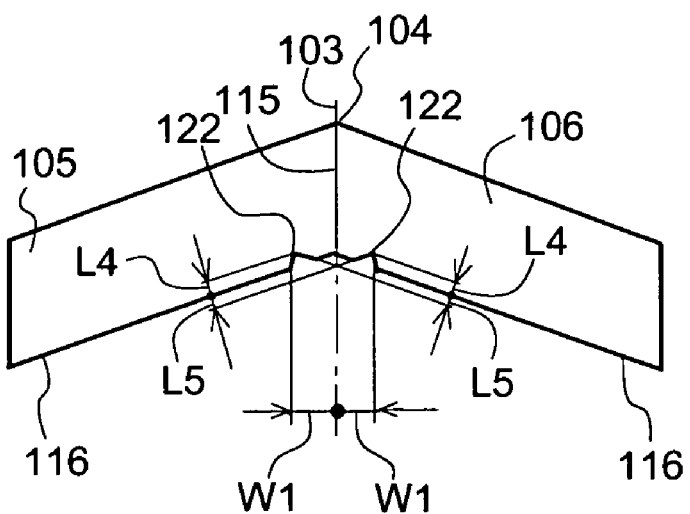
FIG. 21 is a plan view of a fifth modified example of a tooth in the second preferred embodiment.
Figure 22A:
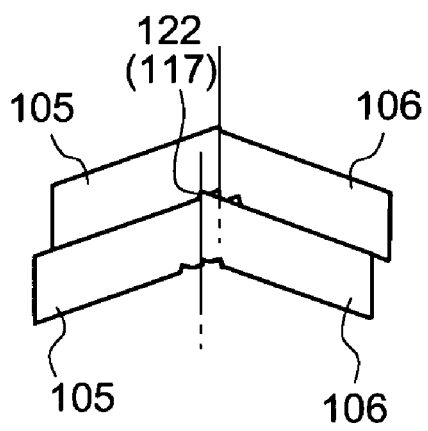
FIGS. 22A and 22B are views showing the meshing state of the fifth modified example of teeth in the second preferred embodiment.
Figure 22B:
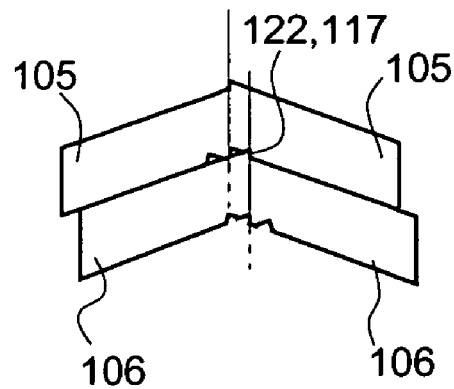
Figure 23:
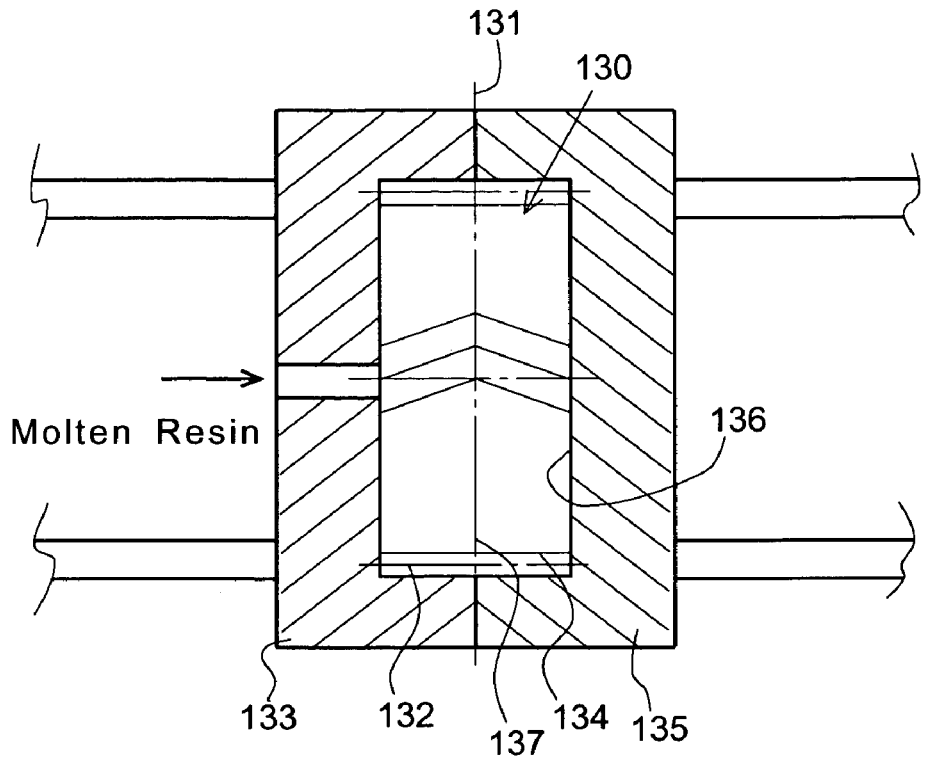
FIG. 23 is a sectional view of an injection molding die for forming a first conventional resin double helical gear.
Figure 24:
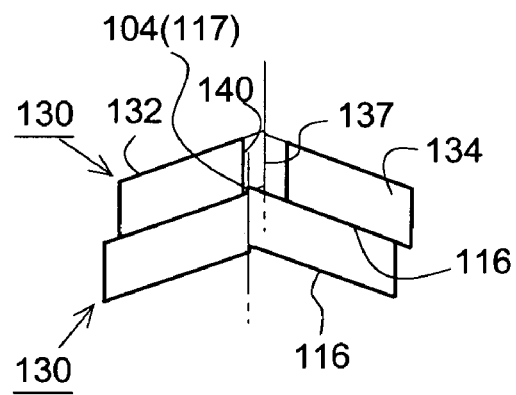
FIG. 24 is a plan view showing the meshing state of a second conventional resin double helical gear.

As shown in FIG. 21, a pair of substantially triangular meshing relief portions 122, 122 may be formed in the reverse 116 of the first and second gear portions 105 and 106 symmetrically in lateral directions to absorb a stepped portion 117, so that the first gear portions 105, 105 and the second gear portions 106, 106 mesh with each other, respectively, to transmit power (see FIGS. 22A and 22B). The dimensions L4, L5 and W1 of the meshing relief portion 122 are determined so as to be capable of absorbing the dislocation of the stepped portion 117 (the dimensions of the stepped portion).

The teeth 107 may have the meshing relief portions 113, 120 and the meshing relief portions 118, 121, 122 in the top portion 104 and reverse 116, respectively.

As described above, according to the resin double helical gear in the second preferred embodiment of the present invention, even if the butt surface between the separated two dies (first and second dies) is dislocated to cause the butt surface between the first and second gear portions to be dislocated, it is possible to prevent the gear from interfering with the stepped portion on the chevron-shaped top portion or reverse of a companion gear (a resin double helical gear) since the meshing relief portion is formed in the chevron-shaped top portion or its reverse of teeth. Therefore, the first and second gear portions contact the first and second gear portions of the companion gear, respectively, so that it is possible to transmit power without producing a thrust load.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A resin double helical gear comprising:
a first gear portion arranged on one side in face width directions from a substantially central portion in the face width directions, said first gear portion having teeth which are helical in a direction;
a second gear portion arranged on the other side in the face width directions from the substantially central portion in the face width directions, said second gear portion having teeth which are helical in a direction opposite to that of said first gear portion, said first gear portion and said second gear portion being molded so as to be integrated with each other in such a shape that a pair of helical gear halves being helical in opposite directions to each other are stuck together; and
a stepped portion of each of teeth between said first and second gear portions, said stepped portion being elastically or plastically deformed to collapse to allow an excess thickness due to deformation of said stepped portion to be received in a space between said resin double helical gear and a companion gear when said resin double helical gear meshes with said companion gear.

2. A resin double helical gear comprising:
a first gear portion arranged on one side in face width directions from a substantially central portion in the face width directions, said first gear portion having teeth which are helical in a direction; and
a second gear portion arranged on the other side in the face width directions from the substantially central portion in the face width directions, said second gear portion having teeth which are helical in a direction opposite to that of said first gear portion, said first gear portion and said second gear portion being molded so as to be integrated with each other in such a shape that a pair of helical gear halves being helical in opposite directions to each other are stuck together,
wherein each of teeth of said resin double helical gear has a different helix angle from that of a companion gear meshing therewith, each of the teeth of said double helical gear being formed by a corresponding one of said first gear portion and a corresponding one of said second gear portion.

3. A resin double helical gear comprising:
a first gear portion arranged on one side in face width directions from a substantially central portion in the face width directions, said first gear portion having teeth which are helical in a direction; and
a second gear portion arranged on the other side in the face width directions from the substantially central portion in the face width directions, said second gear portion having teeth which are helical in a direction opposite to that of said first gear portion, said first gear portion and said second gear portion being molded so as to be integrated with each other in such a shape that a pair of helical gear halves being helical in opposite directions to each other are stuck together,
wherein each of said first and second gear portions is curved so as to be convex toward a companion gear meshing with said resin double helical gear.

4. A resin double helical gear comprising:
a first gear portion arranged on one side in face width directions from a substantially central portion in the face width directions, said first gear portion having teeth which are helical in a direction;
a second gear portion arranged on the other side in the face width directions from the substantially central portion in the face width directions, said second gear portion having teeth which are helical in a direction opposite to that of said first gear portion, said first gear portion and said second gear portion being molded so as to be integrated with each other in such a shape that a pair of helical gear halves being helical in opposite directions to each other are stuck together; and
a meshing relief portion having such a shape that a chevron-shaped top portion of each of teeth of said resin double helical gear in the substantially central portion in the face width directions is cut off.

5. A resin double helical gear comprising:
a first gear portion arranged on one side in face width directions from a substantially central portion in the face width directions, said first gear portion having teeth which are helical in a direction;
a second gear portion arranged on the other side in the face width directions from the substantially central portion in the face width directions, said second gear portion having teeth which are helical in a direction opposite to that of said first gear portion, said first gear portion and said second gear portion being molded so as to be integrated with each other in such a shape that a pair of helical gear halves being helical in opposite directions to each other are stuck together; and
a meshing relief portion having such a shape that the reverse side of a chevron-shaped top portion of each of teeth of said resin double helical gear in the substantially central portion in the face width directions is recessed.

6. A gear train comprising a first resin double helical gear and a second double helical gear meshing therewith, said first resin double helical gear comprising:
a first gear portion arranged on one side in face width directions from a substantially central portion in the face width directions, said first gear portion having teeth which are helical in a direction;
a second gear portion arranged on the other side in the face width directions from the substantially central portion in the face width directions, said second gear portion having teeth which are helical in a direction opposite to that of said first gear portion, said first gear portion and said second gear portion being molded so as to be integrated with each other in such a shape that a pair of helical gear halves being helical in opposite directions to each other are stuck together; and
a stepped portion of each of teeth of said first resin double helical gear between said first and second gear portions, said stepped portion being elastically or plastically deformed to collapse to allow an excess thickness due to deformation of said stepped portion to be received in a space between said first resin double helical gear and said second double helical gear when said first resin double helical gear meshes with said second double helical gear.

7. A gear train comprising a first resin double helical gear and a second double helical gear meshing therewith, said first resin double helical gear comprising:
a first gear portion arranged on one side in face width directions from a substantially central portion in the face width directions, said first gear portion having teeth which are helical in a direction; and
a second gear portion arranged on the other side in the face width directions from the substantially central portion in the face width directions, said second gear portion having teeth which are helical in a direction opposite to that of said first gear portion, said first gear portion and said second gear portion being molded so as to be integrated with each other in such a shape that a pair of helical gear halves being helical in opposite directions to each other are stuck together, wherein each of teeth of said first resin double helical gear has a different helix angle from that of said second double helical gear, each of the teeth of said double helical gear being formed by a corresponding one of said first gear portion and a corresponding one of said second gear portion.

8. A gear train comprising a first resin double helical gear and a second double helical gear meshing therewith, said first resin double helical gear comprising:

a first gear portion arranged on one side in face width directions from a substantially central portion in the face width directions, said first gear portion having teeth which are helical in a direction; and a second gear portion arranged on the other side in the face width directions from the substantially central portion in the face width directions, said second gear portion having teeth which are helical in a direction opposite to that of said first gear portion, said first gear portion and said second gear portion being molded so as to be integrated with each other in such a shape that a pair of helical gear halves being helical in opposite directions to each other are stuck together, wherein each of said first and second gear portions of said first resin double helical gear is curved so as to be convex toward said second double helical gear.

9. A gear train comprising a first resin double helical gear and a second double helical gear meshing therewith, said first resin double helical gear comprising:

a first gear portion arranged on one side in face width directions from a substantially central portion in the face width directions, said first gear portion having teeth which are helical in a direction;

a second gear portion arranged on the other side in the face width directions from the substantially central portion in the face width directions, said second gear portion having teeth which are helical in a direction opposite to that of said first gear portion, said first gear portion and said second gear portion being molded so as to be integrated with each other in such a shape that a pair of helical gear halves being helical in opposite directions to each other are stuck together; and a meshing relief portion having such a shape that a chevron-shaped top portion of each of teeth of said first resin double helical gear in the substantially central portion in the face width directions is cut off.

10. A gear train comprising a first resin double helical gear and a second double helical gear meshing therewith, said first resin double helical gear comprising:

a first gear portion arranged on one side in face width directions from a substantially central portion in the face width directions, said first gear portion having teeth which are helical in a direction;

a second gear portion arranged on the other side in the face width directions from the substantially central portion in the face width directions, said second gear portion having teeth which are helical in a direction opposite to that of said first gear portion, said first gear portion and said second gear portion being molded so as to be integrated with each other in such a shape that a pair of helical gear halves being helical in opposite directions to each other are stuck together; and a meshing relief portion having such a shape that the reverse side of a chevron-shaped top portion of each of teeth of said first resin double helical gear in the substantially central portion in the face width directions is recessed.

* * * * *